United States Patent [19]
Jacobs et al.

[11] Patent Number: 5,488,571
[45] Date of Patent: Jan. 30, 1996

[54] METHOD AND APPARATUS FOR DOWNLOADING INFORMATION FROM A CONTROLLABLE LIGHT SOURCE TO A PORTABLE INFORMATION DEVICE

[75] Inventors: Michael A. Jacobs, Naugatuck; Mark A. Insero, Waterbury, both of Conn.

[73] Assignee: Timex Corporation, Middlebury, Conn.

[21] Appl. No.: 155,326

[22] Filed: Nov. 22, 1993

[51] Int. Cl.[6] .............................. G06F 15/16; G06F 1/00
[52] U.S. Cl. .................................. 364/705.07; 364/708.1
[58] Field of Search ..................... 364/705.07, 705.05, 364/708.1, 709.11, 709.12, 709.01; 345/169

[56] References Cited

U.S. PATENT DOCUMENTS

| | | | |
|---|---|---|---|
| Re. 32,282 | 11/1986 | Baer | 273/85 G |
| 3,993,861 | 11/1976 | Baer | 358/146 |
| 4,130,738 | 12/1978 | Sandstedt | 179/90 B |
| 4,211,065 | 7/1980 | Schmitz et al. | 368/47 |
| 4,329,684 | 5/1982 | Monteath et al. | 340/707 |
| 4,403,869 | 9/1983 | Crutcher | 368/10 |
| 4,486,847 | 12/1984 | Wattenhofer | 364/705.07 |
| 4,534,012 | 8/1985 | Yokozawa | 364/900 |
| 4,608,601 | 8/1986 | Shreck et al. | 358/146 |
| 4,613,904 | 9/1985 | Lurie | 358/142 |
| 4,807,031 | 2/1989 | Broughton et al. | 358/142 |
| 4,855,725 | 8/1989 | Fernandez | 340/706 |
| 4,882,685 | 11/1989 | Van der Lely | 364/705.07 |
| 4,999,617 | 3/1991 | Uemura et al. | 340/706 |
| 5,007,015 | 4/1991 | Yokozawa | 364/705.07 |
| 5,241,161 | 8/1993 | Zuta | 235/382 |
| 5,307,297 | 4/1994 | Iguchi et al. | 364/708.1 |

FOREIGN PATENT DOCUMENTS

| | | |
|---|---|---|
| 0338936 | 4/1988 | France . |
| 2807214 | 8/1978 | Germany . |
| 0148351 | 7/1985 | Germany . |
| 3740794 | 6/1989 | Germany . |
| 61-031986 | 2/1984 | Japan . |
| 59-205661 | 11/1984 | Japan . |
| 60021477 | 2/1985 | Japan . |
| 60220892 | 11/1985 | Japan . |
| 2044446 | 1/1980 | United Kingdom . |
| 2079995 | 1/1982 | United Kingdom . |
| 2166328 | 4/1986 | United Kingdom . |
| 2165129 | 10/1988 | United Kingdom . |
| 2244617 | 12/1991 | United Kingdom . |

OTHER PUBLICATIONS

59th Congress of the SSC–ASMT–85 "Development of New Wrist Instruments" Yokozawa Y. et al. p. 155–159.

Funkschau, vol. 57, No. 5, Mar. 1985 p. 68 "Computer Mit Langem Arm".

Funkschau, vol. 57, No. 5, Mar. 1985 p. 89 "Datenbank am Hangelenk".

*Primary Examiner*—Tan V. Mai
*Attorney, Agent, or Firm*—William C. Crutcher

[57] ABSTRACT

A system for transferring data from a CRT (cathode ray tube) video display monitor on a personal computer to a portable information device such as a multifunction electronic wristwatch. The CRT video display has a video signal generator providing raster scanning of the screen and a program for formatting the binary coded data into blocks of serial data bits, with start bit and stop bit. The blocks of data are supplied to the video signal generator in synchronism with raster scanning of the screen so as to provide an integral number of one or more blocks of data for each vertical frame, and modulated to vary the brightness of the screen and provide light pulses corresponding to presence or absence of binary coded transmitter pulses. The portable information device is manipulated within line of sight of the CRT screen and has a photosensor to detect light pulses when the photosensor is directed toward the screen. Signals from the photosensor are amplified and filtered to remove ambient light source flicker and extraneous spurious light signals and to convert the receiver pulses to binary coded data blocks varying between high and low logic levels at a preselected pulse repetition rate. The portable information device stores the received data for further use.

33 Claims, 14 Drawing Sheets

5,488,571

METHOD AND APPARATUS FOR DOWNLOADING INFORMATION FROM A CONTROLLABLE LIGHT SOURCE TO A PORTABLE INFORMATION DEVICE

BACKGROUND OF THE INVENTION

This invention relates to transferring information or data from a data transmitter including a controllable light source, such as a computer having a cathode ray tube (CRT) screen display to a portable information device (e.g., a wrist instrument such as a multifunction electronic wristwatch).

The use of both computers and hand-sized, portable information devices continues to expand. Various methods have been developed for transferring information between computer lo processors (e.g., both synchronous and asynchronous serial communication devices), using communications interface conventions such as RS232C, RS449A and V.35. The binary coded signals may be transmitted in standard codes such as ASCII, EBCDIC, with established protocols providing for handshake procedures, starting, stopping and checking the data transmitted. Many transfer methods require a direct, electrical connection between devices. Is Such direct interconnections can be cumbersome, and in some circumstances impractical, due to the additional hardware requirements involved. Other communication methods utilize radio-frequency (RF) technologies or optical technologies to perform information transfer. RF technology is deficient because it also requires additional hardware, as well as increased power requirements for the transmission of information.

There are several ways to use optical technology for transferring information. One well-known method utilizes a light pen to detect and select information on a CRT. This method requires that the user manually move the light pen to each object on the screen to read an entire image. This method of data capture is inherently slow and can be prone to user errors (e.g., skipped objects). Possible interference from other signals requires placement in close proximity to the desired signal. Another drawback of light pen methodology is the necessity for peripheral hardware in addition to the portable device or incorporated into the portable device specifically for information transfer back to the device controlling the CRT.

An alternative implementation of optical technology utilizes a combination of optical emitters and photosensors to transfer information. Typically, hardware is dedicated specifically to both devices of the transfer process to insure that the receiver and transmitter are set to operate at the same transmission rate or baud rate. The device to be loaded with information is placed in front of the emitters and the information transfer is started. Unfortunately, this method of information transfer also requires specialized hardware and is often not compatible with existing hardware installations. Various proposals have been made for supplying binary coded data simultaneously with television broadcast signals at special small window locations on the CRT screen. Such proposals, discussed in exemplary U.S. Pat. No. 4,999,617 issued Mar. 12, 1991 to Uemura et at; and U.S. Pat. No. 3,993,861 issued Nov. 23, 1976 to Baer require photosensor devices touching or closely focused at a data image on the CRT screen, and sometimes held with vacuum cups.

As the use of portable information devices expands, there is an increasing need for such devices to be flexible in their functionality. Many existing portable devices have been designed for multiple functions, such as a combination watch/calculator. Wrist instruments have expanded from their time keeping role to include: databanking, chronometer, alarm, computation, odometer, paging, and communication functions. A disadvantage of many existing portable information devices is that they cannot easily be downloaded with programs providing new functionality. A further disadvantage of many existing portable information devices is that their databases cannot be easily updated without manually entering new data. The existing devices that can be updated typically have very limited input capabilities because they either have no keyboards at all or very rudimentary keyboards, or else they require that the updating occur from specific hardware. This severely limits the user's flexibility because the user must have easy access to updating hardware, which will most likely not be portable. Wristwatches in particular are difficult for entry of information or updating information. Various schemes have been proposed for entry of data using pushbuttons or tiny keyboards, none of which have been entirely satisfactory. An optimum configuration would be one where the portable device could be updated from any controllable light source such as a CRT video display screen found in desk size computer monitors and television sets.

It would therefore be desirable to provide a portable information device with which downloading of information can be performed without physically connecting or requiring close proximity of the portable device to the information source. It would also be desirable to provide a portable information device with which simpler data transfer or downloading of information can be performed without the use of additional peripheral hardware on the sending computer system or other light sources. It would further be desirable to provide a portable information device that suitably receives asynchronous serial data at the highest baud rate of which it is capable of receiving reliably from the source device. It would be even more desirable to provide a portable information device which can be downloaded from controllable light sources such as existing CRT video displays without requiring any hardware modifications.

SUMMARY OF THE INVENTION

In view of the foregoing, it is an object of this invention to provide a portable information device that can be downloaded with new data or functionality without being physically connected to or in close proximity with the information source device.

It is an additional object of this invention to provide a portable information device that can be downloaded with information without the use of additional peripheral hardware.

It is also an object of this invention to provide a portable information device that suitably receives asynchronous serial data at the highest transfer rate which it is capable of reliably receiving from the source device.

It is a further object of this invention to provide a portable information device that can be downloaded from existing CRT video displays without requiring any hardware modifications.

Briefly stated, the invention comprises a system for transferring data from a data transmitter to a portable information device, the data transmitter comprising a source of binary coded data to be transferred, a CRT video display with a video signal generator providing raster scanning of a screen at a horizontal frequency and a vertical frame rate, means formatting the binary coded data into blocks of serial data bits, with start bit and stop bit, each block adapted to be transmitted as a stream of binary coded transmitter pulses at a selected pulse repetition rate substantially less than the horizontal scanning frequency and substantially greater than the vertical frame rate of the CRT, means transmitting the blocks of data to the video signal generator in synchronism with raster scanning of the screen so as to provide an integral number of one or more blocks of data for each vertical frame, and means modulating the video signal generator to vary the brightness of the screen and provide light pulses corresponding to presence or absence of binary coded transmitter pulses. The portable information device comprises a portable casing adapted to be manipulated at a location spaced from, and in within line of, sight of the CRT screen, a photosensor mounted on the casing adapted to detect light pulses when the photosensor is directed toward the screen, an amplifier within the casing to provide amplified binary coded receiver pulses corresponding to the light pulses, band pass filter means within the casing passing signals within the frequency band of the preselected pulse repetition rate, but attenuating higher and lower frequencies, means to convert the receiver pulses to binary coded data blocks varying between high and low logic levels at the preselected pulse repetition rate, and data collection means within the casing comprising an asynchronous serial data interface connected to temporarily store the data, and having random access memory means for storing data from the register.

DRAWINGS

Other advantages and objects of the invention will be better understood by reference to the following drawings, taken in connection with the accompanying description, in which:

FIG. 1 is a simplified partial elevational view of a preferred embodiment of the invention illustrating a data transfer system in which the data transmitter is a CRT monitor used in conjunction with a personal computer, and in which the information device is a multifunction electronic wrist instrument, FIG. 2 is a simplified partial plan view of the portable information device exemplified as a wrist instrument, FIG. 3 is a simplified elevational view of a CRT screen acting as a transmitter in accordance with principles of this invention, FIG. 4 is a simplified graph illustrating typical phosphor persistence and timing in conjunction with a CRT raster, FIG. 5 is a graph illustrating displayed light pulses during one CRT frame period, FIG. 6 is a graph depicting receipt of asynchronous serial data transmitted by the portable information device during the same CRT frame period corresponding to FIG. 5, FIG. 7 is a block diagram of the circuitry of a typical portable information device constructed in accordance with the principles of this invention, FIG. 8 is a circuit diagram of a suitable photosensor and interface circuit used in the portable information device, FIG. 9 is a flow chart depicting a typical data reception sequence of a portable information device in accordance with the principles of this invention, FIGS. 10a–10d (hereinafter referred to as FIG. 10) are a flow chart depicting a typical data transmission sequence of a CRT monitor used as a controllable light source in accordance with the principles of this invention, FIGS. 11a and 11b (hereinafter referred to as FIG. 11) are a flow chart depicting the operation of a user interface protocol, FIG. 12 is a simplified, partial elevational view of a modified data transfer system using a CRT monitor of a personal computer as a data transmitter and using a hand held telephone menu and appointment scheduling device serving as the portable information device, FIG. 13 is a top plan view of the hand held device, FIG. 14 is a bottom plan view of the hand held device, and FIG. 15 is an elevational view of a CRT screen display illustrating an alternate arrangement of data transfer patterns.

DESCRIPTION OF THE PREFERRED EMBODIMENT

Figure 1:
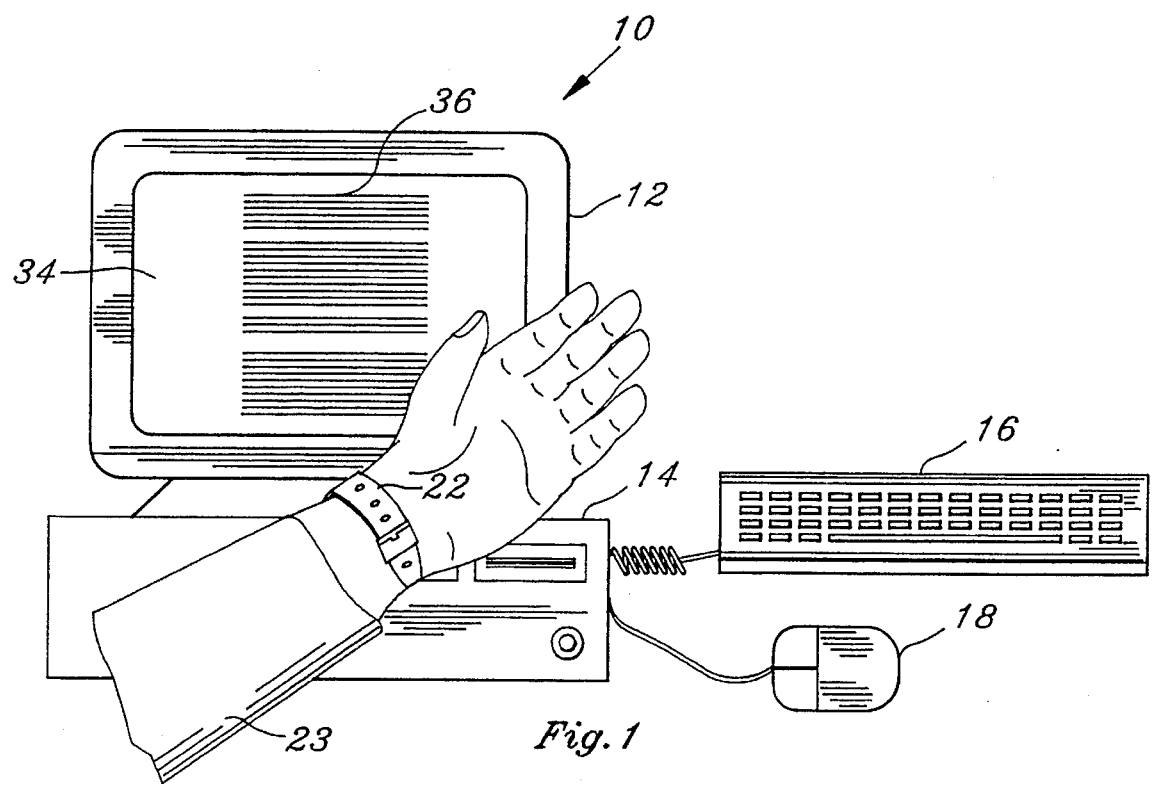
Figure 2:
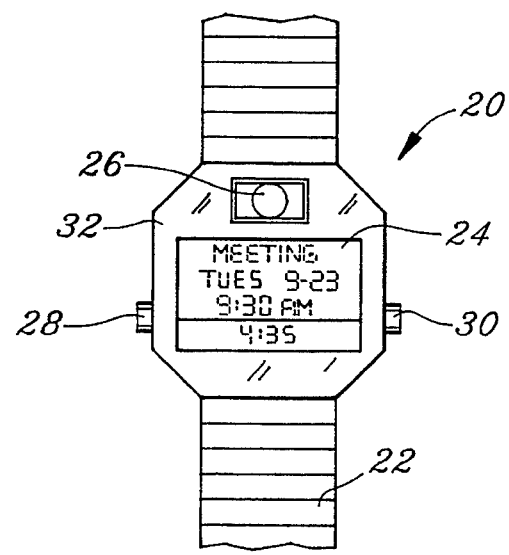

Referring to FIG. 1 of the drawing, a controllable light source and data transmitter shown generally as 10 includes a conventional CRT monitor 12, conventional computer 14, keyboard 16 and mouse 18. The portable information device comprises a multifunction electronic wristwatch seen as 20 in FIG. 2 held by a strap 22 on the wrist of a user 23. The output for the portable information device or wristwatch 20 may be a dot matrix liquid crystal display (LCD) 24 used to display the time, date or other common timepiece functions in addition to functioning as an output display for any of the computer functions that are downloaded into portable device 20. Device 20 also includes a photosensor 26 and one or more operating switches 28, 30, all disposed on a casing 32. The casing 32 may be manipulated as shown in FIG. 1 so as to direct photosensor 26 toward CRT monitor 12 at a comfortable distance from the monitor, so that it is spaced from, and within line of sight of the monitor 12.

The CRT monitor includes a conventional screen 34 on which, in accordance with the present invention, are displayed binary coded data, transmitted asynchronously as sequential scan line segments 36.

The transmitted data may come from a source of data contained within the computer 14, such as data stored in the computer memory. Alternately the source of data could be received asynchronously from an outside source such as a modem connected to a remote data source and transmitted immediately to the monitor 12 via the computer 14 or stored for later transmission. If the CRT is a video display for a television, the data source may be the antenna input or cable tv input which is coupled to appropriate circuitry controlling the television picture on the CRT.

Figure 3:
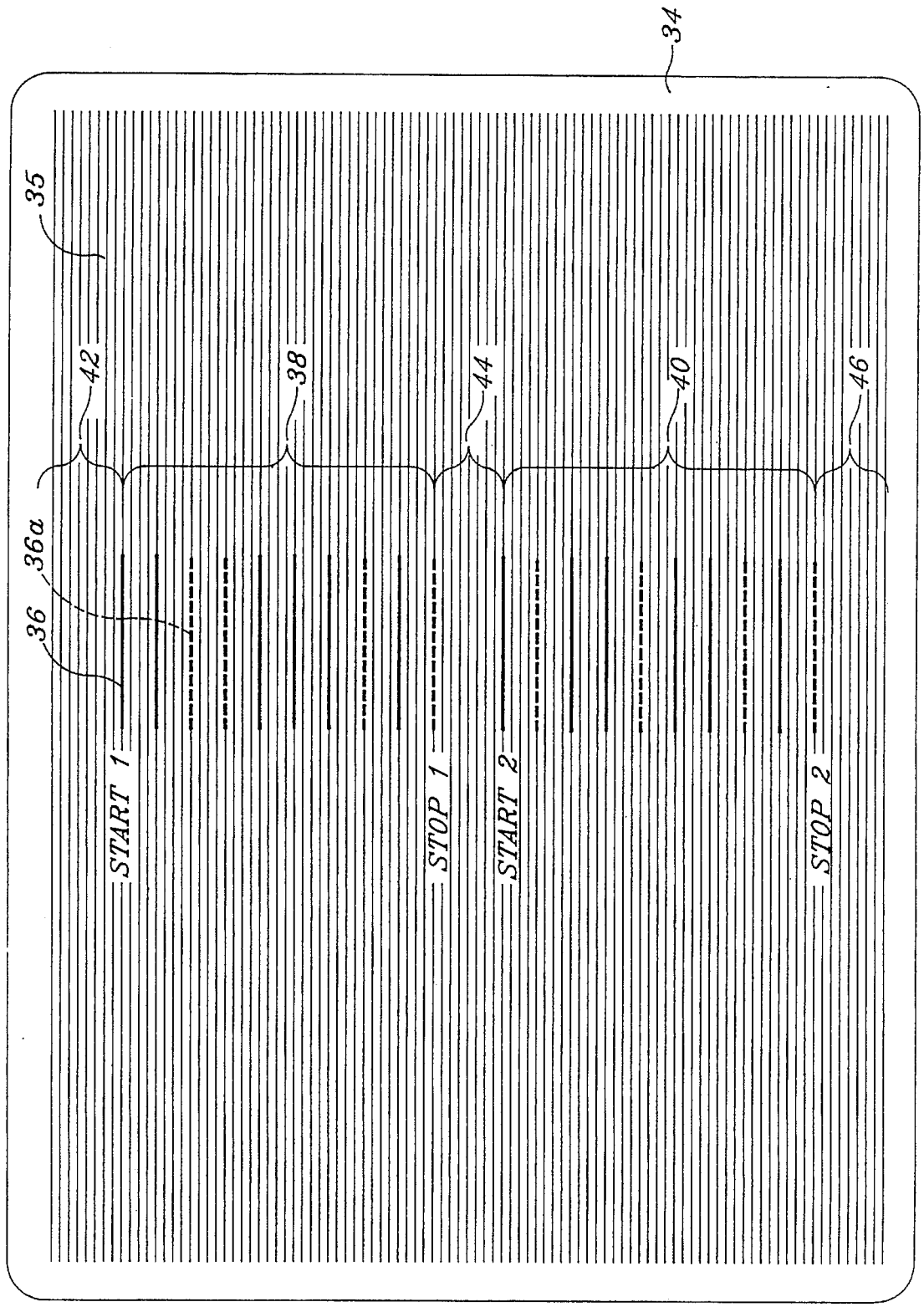

FIG. 3 is an enlarged view of CRT screen 34 showing only one type of data transfer pattern possible with the invention. In this case, the successive CRT scan segments 36 are arranged to appear successively so as to transmit two blocks 38, 40 of binary coded data as a stream of light pulses. Blocks 38, 40 are transmitted during the interval of one vertical scan of the CRT raster, and there are an integral number of blocks per frame, here two blocks, which may leave intervals 42, 44, 46 when the vertical scan is active, but when no data is being transmitted.

Any conventional CRT video driver may be used, either monochrome or color, having a conventional video signal generator which may be modulated to vary the brightness of the signal (or to vary the luminance in the case of a color monitor). For example, a VGA monitor with 640×480 resolution may be used which has a horizontal scan frequency of 31.5 kHz and a vertical scan rate (vertical refresh rate) of 60 Hz. Raster horizontal scan lines 35 are shown for every eighth horizontal scan line, omitting intervening scan lines for clarity Referring to FIG. 3, the two blocks 38, 40 appearing on screen 34 comprise binary coded data in one of the conventional formats and using any desired conventional code and protocol suitable for asynchronous serial data transmission. Here the selected convention for the data transmission protocol consists of a start bit, eight data bits, and a stop bit. A scan line segment 36 which is activated at high brightness represents binary logic 0, and a scan segment which is not illuminated represents a binary logic level 1, indicated by the dashed line 36a. In the convention selected, the start bit is logic level 0 and the stop bit is logic level 1. Either logic convention may be selected, and if desired, an illuminated segment may represent logic level 1.

A suitable video driver program is resident in computer 14, which may be programmed to modulate the video signal generator to increase the brightness of the screen at selected coordinates on screen 34 from the beginning to the end of each selected scan line segment 36, 36a. As is well known in the art, the raster scan by the electron beam energizes successive dots of phosphor, the brightness of which dots persists after they have been energized. The speed of data transmission which may be effected in the subject invention depends to some extent on the persistence of the phosphor as well as the speed of response and threshold level of the photodetector circuit.

Figure 4:
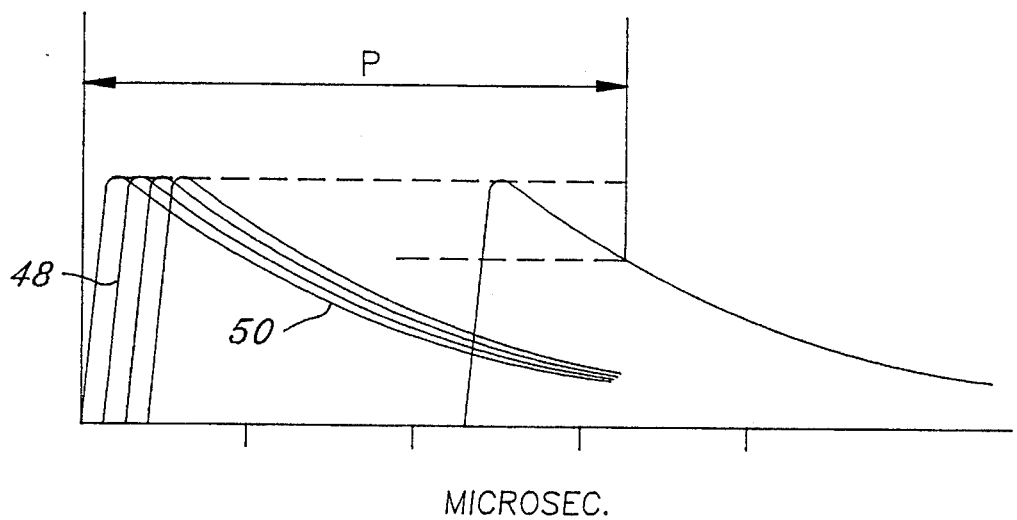

Reference to FIG. 4 shows a representative graph for phosphor brightness (expressed as a percentage) versus time. An illuminated scan line segment 36 is made up of a series of individual dot or pixel excitations lasting only a fraction of a microsecond. When the phosphor is energized, it builds up brightness during the excitation period in a process called fluorescence shown at reference 48, and then the brightness decays during a period of time determined by the persistence of the phosphor known as phosphorescence shown at reference 50. Successive pixels (not shown to scale) are energized rapidly and depending upon the threshold of the phototransistor in the photosensor, and its frequency response, is "seen" by the photosensor only as a single light pulse P.

Figure 5:
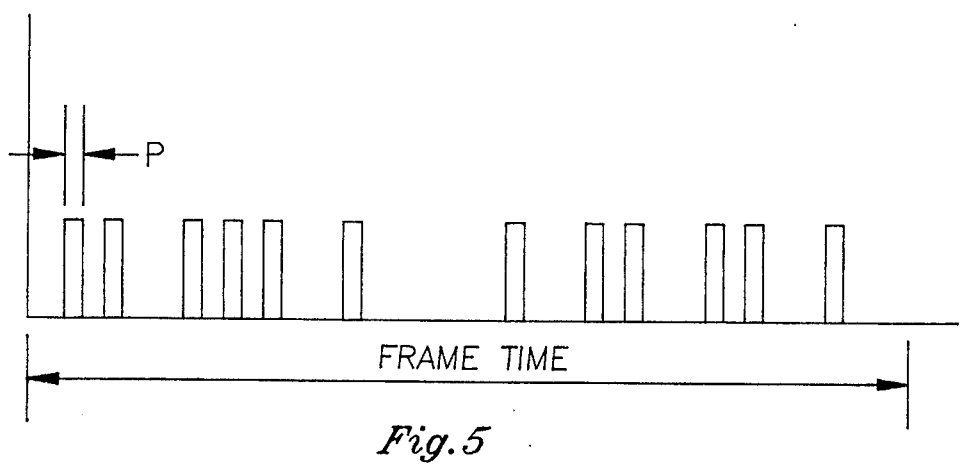

Referring to FIG. 5 of the drawing, the greatly expanded time scale depicts the time of a complete CRT frame. At the vertical scan rate selected of 60 Hz, this is 16,667 microseconds. A series of light pulses P represent logic 0 (or do not occur to represent logic 1) at a preselected pulse repetition rate. The pulse repetition rate is selected by programming the location on the CRT screen (bit mapping the screen coordinates) where the scan line segments for start bit, data bits and stop bit will start and stop. The scale of FIG. 5 is greatly exaggerated with respect to the width of pulses P, which only exist during a portion of a horizontal scan line. For example, at a horizontal scan frequency of 31.5 kHz, the time required to scan one horizontal line is about 32 microseconds. Therefore the time period of a pulse P (corresponding to an illuminated scan segment) may be approximately 10 or less microseconds, or if desired it may occupy the full length of a scan line. Thereafter, there is a time interval of several scan lines including the required raster flyback time until the next pulse P is displayed. Therefore the pulse repetition rate is substantially less than the horizontal scan frequency.

A conventional communications program in computer 14 may format the binary coded data to be transferred into blocks of serial data bits and transmit the blocks to the video signal generator of the CRT in synchronism with raster scanning of the screen so that successive integral data blocks such as data blocks 38, 40 from the data source appear on each successive CRT frame, i.e., two data blocks are transmitted each time the CRT screen is refreshed. The data is sent in serial form as RZ (Return to Zero) pulses.

Alternatively, the video display of data to be transferred may be associated with a television screen rather than a computer monitor. In this case, the source of data is either the antenna input or cable tv input which is coupled to the television video signal generator. Additional control means are necessary to synchronize the data transmission with the raster scanning of the screen, as well as to modify the regular television broadcast picture.

Figure 7:
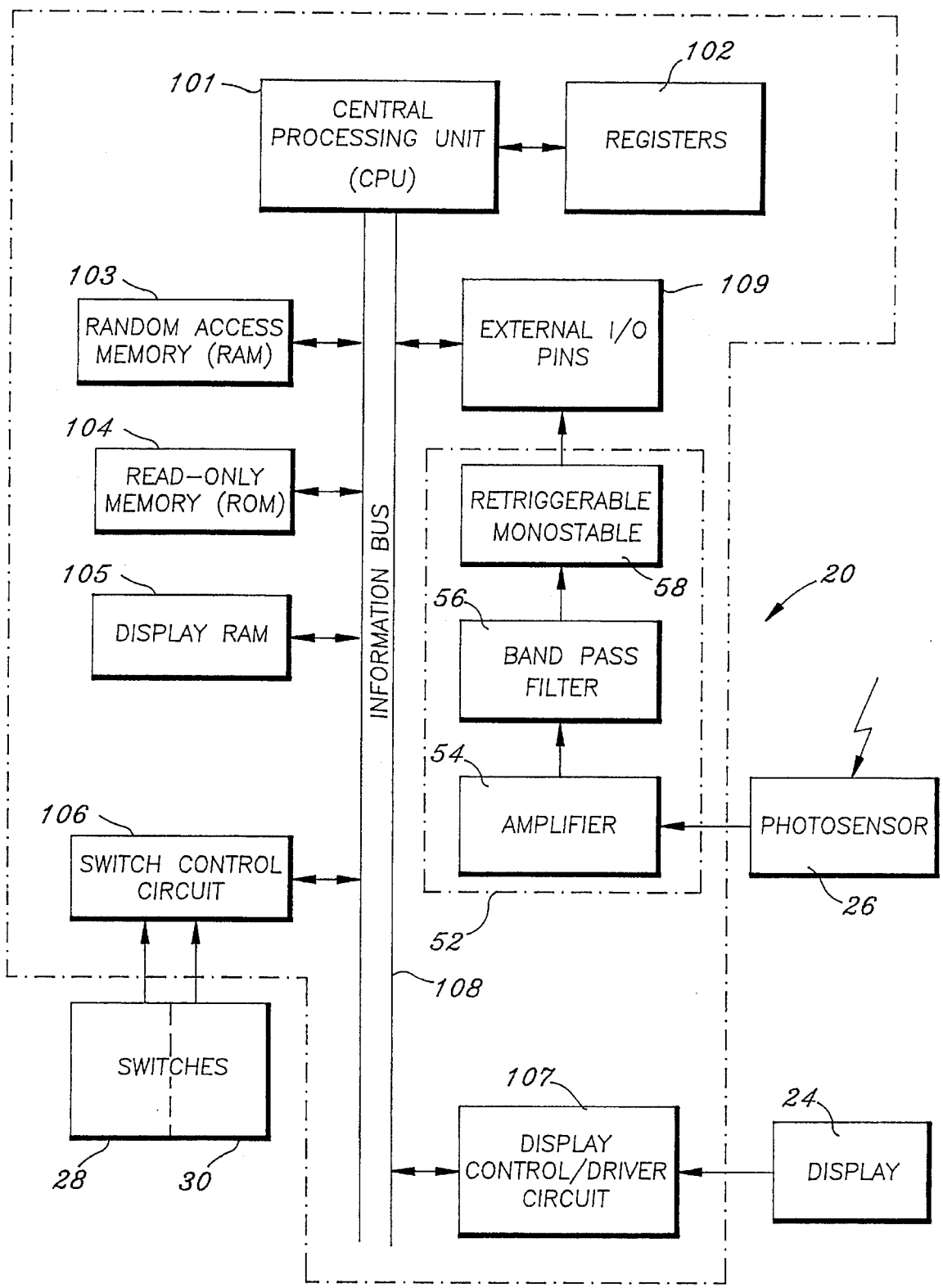

FIG. 7 shows the internal configuration of portable device 20. Control of device 20 is accomplished by central processing unit (CPU) 101, which is directly connected to registers 102. CPU 101 utilizes registers 102 to temporarily store data during information processing. CPU 101 is coupled to the remaining internal hardware via information bus 108. CPU 101 accesses random access memory (RAM) 103 via bus 108 for data storage and retrieval during various operations (e.g., storage of telephone numbers). Read-only memory (ROM) 104 is used to store the initial power-up programs for CPU 101, as well as other information (e.g., model number, serial number), a suitable operating program for controlling alternate functions (such as timekeeping in the case of a wristwatch) and is also coupled to CPU 101 via bus 108.

Display RAM 105 is also connected to bus 108, and is used by CPU 101 and display control/driver circuit 107 to control watch display 24. Display circuit 107 is connected between bus 108 and display 24. Photosensor 26 is coupled to CPU 101 through interface circuit 52 to external I/O pins 109, which are connected to bus 108. Switches 28 and 30 are connected to switch control circuit 106, which is connected to bus 108. CPU 101 controls the operation of device 20 based upon inputs from the switches and photosensors, as well as current system status.

The aforementioned elements 101 through 109 are preferably incorporated as a single integrated circuit contained within the casing 32 of the portable information device 20 (here an electronic multifunction wristwatch). For example, such a microprocessor-based integrated circuit is available from Motorola Corporation as model MC68HC05HG, including a timer, real time clock system, asynchronous serial interface, synchronous serial interface, LCD drivers, keyboard, switch and electroluminescent lamp outputs, with ROM and RAM memory adapted to store data as described in this application.

The asynchronous serial interface of the Motorola integrated circuit is adapted to receive asynchronous serial data at two different selectable baud rates and standard NRZ (mark/space) format with one start bit, eight data bits and one stop bit. Using a quartz crystal driven oscillator at the design frequency of 38.4 kHz, the receiver baud rate is software selectable through programmable means to 1200 baud or 2400 baud. Using a quartz crystal driven oscillator at 32.768 kHz, the receiver receives data transmitted at 2048 baud. (This is a non-standard baud rate due to use of a 32.768 kHz quartz crystal which is standard in the watch industry.) The pulse repetition rate for 2048 baud is 2048 pulses per second. The effective baud rate of transmission is less because two blocks are transmitted during one frame, and there are idle times between blocks.

The light pulses seen by photosensor 26 contain data information but they are unsuitable for receipt by external I/O pins 109. Transformation of the data to a suitable NRZ serial format, as well as removal of extraneous light sources in accordance with the present invention, is carried out by interface circuit 52. Interface circuit 52 may be a separate integrated circuit disposed inside casing 212.

Figure 8:
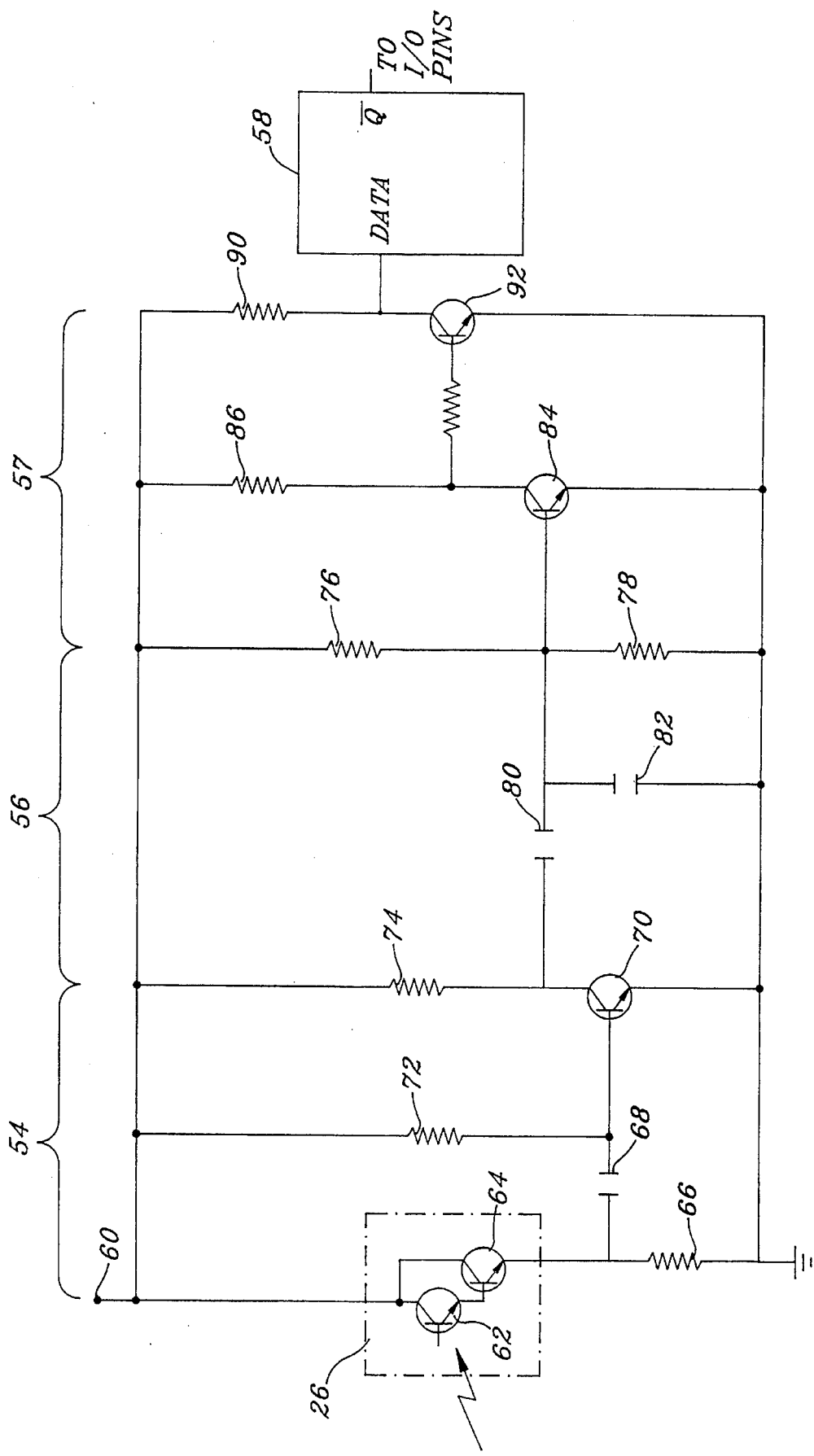

Referring to FIG. 8 of the drawing, one such suitable interface circuit 52 is shown, although it may take different forms according to how it is implemented. Interface circuit (which is drawn to include photosensor 26 although it is external to casing 32) comprises a pre-amplifier section 54, a band pass filter section 56, inverting amplifier section 57 and a means for conveying pulses to high/low logic levels, here seen as a retriggerable monostable multivibrator 58. In the preamplifier 54, a DC voltage source 60, which may be the watch energy cell, is connected to Darlington connected phototransistors 62, 64 through load resistor 66 to ground. A DC blocking capacitor 68 transmits a trigger pulse to the base of transistor 70 when a light pulse of sufficient brightness actuates photosensor 26.

Transistor 70 is connected with resistors 72 and 74 to provide an amplified pulse with gain of approximately 100. A band pass filter 56 is composed of capacitors 80, 82 and resistors 76, 78 connected as illustrated to provide a low cutoff frequency of approximately 1 kHz and a high cutoff frequency of approximately 10 kHz.

One purpose of band pass filter 56 is to remove the effects of ambient artificial lighting and other low frequency components, such as light from the CRT which may occur during screen refresh. Therefore filter 56 attenuates and suppresses frequencies below approximately 1 kHz which includes the 70 Hz screen refresh frequency, and the 120 Hz ambient artificial light disturbance caused by flicker of incandescent and fluorescent lighting.

Band pass filter 56 also suppresses frequencies above approximately 10 kHz which includes the horizontal scanning frequency of both interlaced television receivers (17.5 kHz) and that of CRT computer monitors which can range between 15 and 80 kHz.

Interface circuit 52 further includes an inverting amplifier section 57 including an amplifier comprising transistor 84 with resistors 86, 88 and a Schmitt trigger and inverter comprising transistor 92 and resistor 90, the output of which is connected to monostable retriggerable multivibrator 58.

Monostable multivibrator 58 receives short data pulses at the pulse repetition rate and converts them to respective high and low logic levels of constant repeatable pulse width suitable for receipt by input/output pins 109. If monostable 58 is not retriggered, it reverts to logic high after a predetermined time period.

In order to perform information transfer using portable device 20 and data transmitter 10, the user must begin by putting display 34 in download mode using a software application program which is stored in memory of computer 14. The program includes a signal generation means which, in addition to other functions which are described below, creates a data transfer pattern or guide consisting of sample data blocks 38 and 40. The data transfer pattern is then displayed. These sample images are used by the portable information device program to compare baud rate of portable device 20 with pulse repetition rate of data transmitter 10. For additional user convenience, the location and size of the data transfer pattern on display 34 can be varied by inputs from keyboard 16. The user can set portable device 20 to download mode by depressing control switches 28 or 30, or alternatively, the photosensor 26 can be connected to the interrupt input pin (not shown) of portable device 20, which would cause portable device 20 to automatically switch to download mode. Next, the user places portable device 20 in front of display 34. This is done by manipulating the wristwatch case at a convenient distance, e.g., six inches to three feet from screen display 34, so that photosensor 26 is aimed at the screen.

If data transmitter 10 is a computer, the user may depress a key on computer keyboard 16 to initialize data transfer. If data transmitter 10 is a television set, information to be transferred may be continuously transmitted at intervals. In either case, the signal generation means then executes a communications protocol which is used to control the transfer process. The communications protocol is also resident on the transmitting information source (as part of the signal generation means), whether it is a computer connected directly to monitor 12 or a computer coupled to the transmitter at a television station. In this manner, the only modification that is required for data transmitter 10 is the installation of software. Various communications protocols could be designed by those skilled in the art without departing from the scope and spirit of the invention. Characteristics of one sample protocol are now described in detail.

The communications protocol begins by directing monitor 12 to transmit a signal which forces portable device 20 to a known condition. This is followed by sending an address of the receiving device (such as the model number). If this is correctly received by portable device 20, it beeps, signalling the user that information transfer is beginning. Information transfer is accomplished by setting the sequentially transmitted bits making up the data transfer pattern of blocks 38, 40 to be either bright (signifying a digital low signal) or background (signifying a digital high signal). During information transfer, blocks 38, 40 and subsequent blocks of data are seen by the eye as a series of "images" generated by each pass of the vertical frame of CRT 34. Actually they are a series of sequential light pulses. At each pass of the vertical frame, two blocks of 8 bit binary coded data are captured by the photosensor. By utilizing relatively large intervals between data bit locations and using the entire screen as background, portable device 20 may receive data at relatively low baud rate, if desired. Additionally, arrangement of integral data blocks within a vertical frame can be preselected so that portable device 20 will be compatible with most existing CRTs regardless of the CRTs' vertical frame rate. Therefore, no hardware changes are necessary to enable information transfer using existing CRTs.

Figure 6:
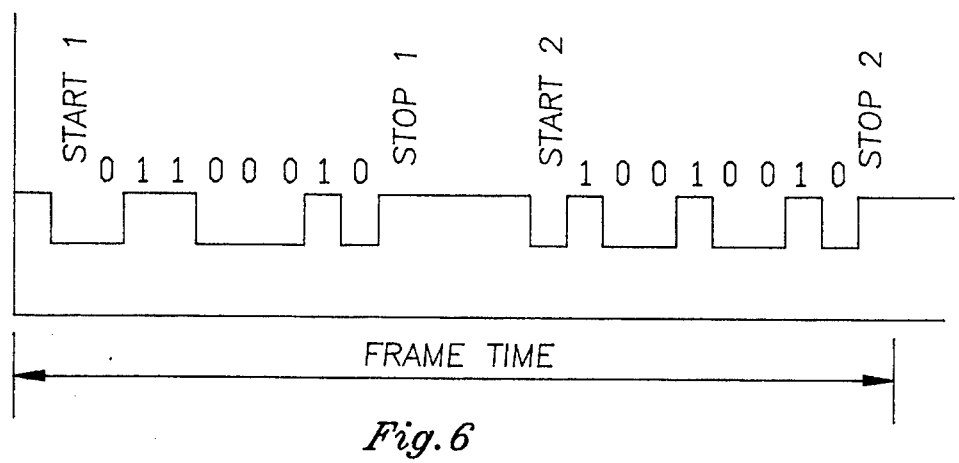
Figure 9:
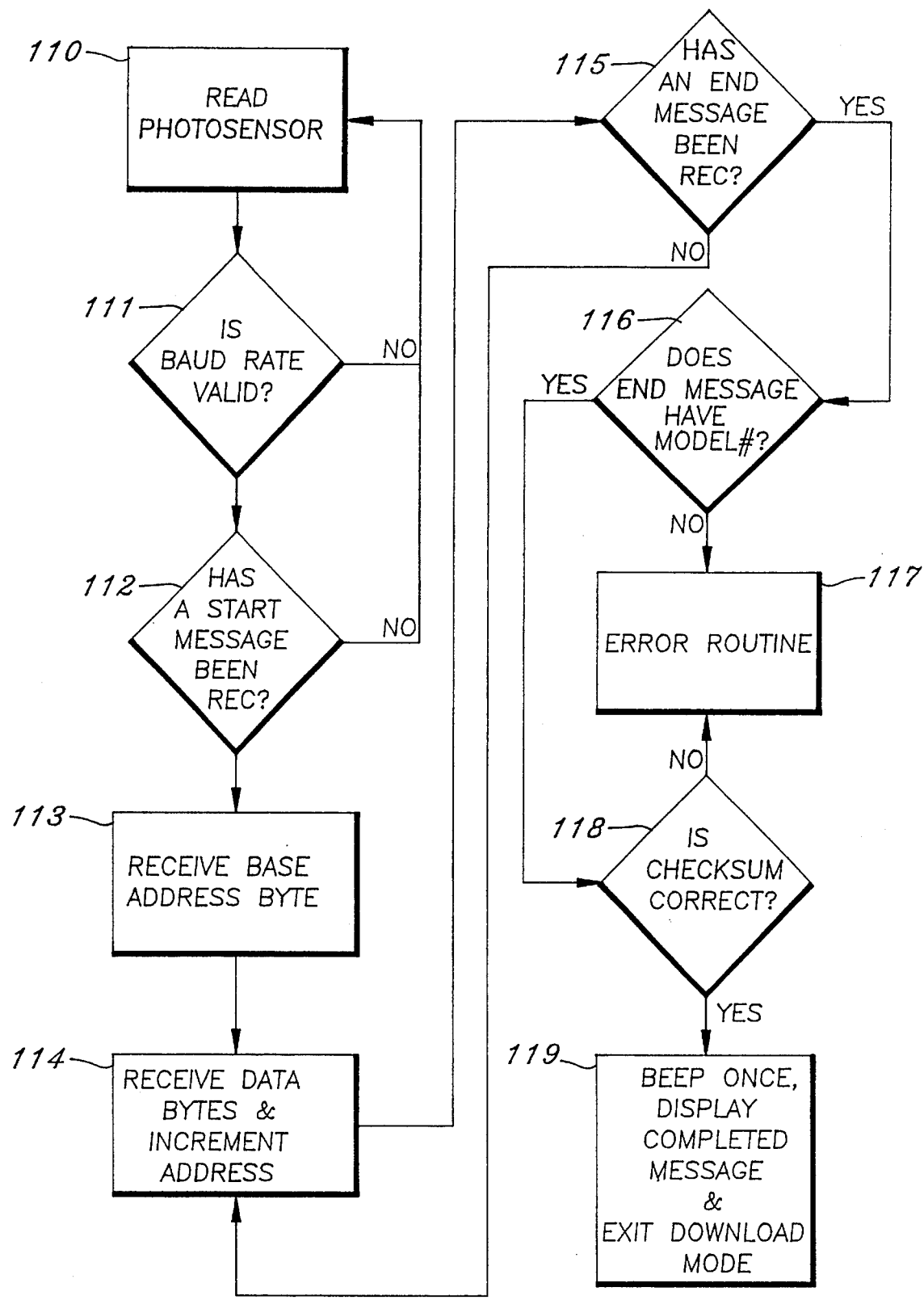
Figure 10A:
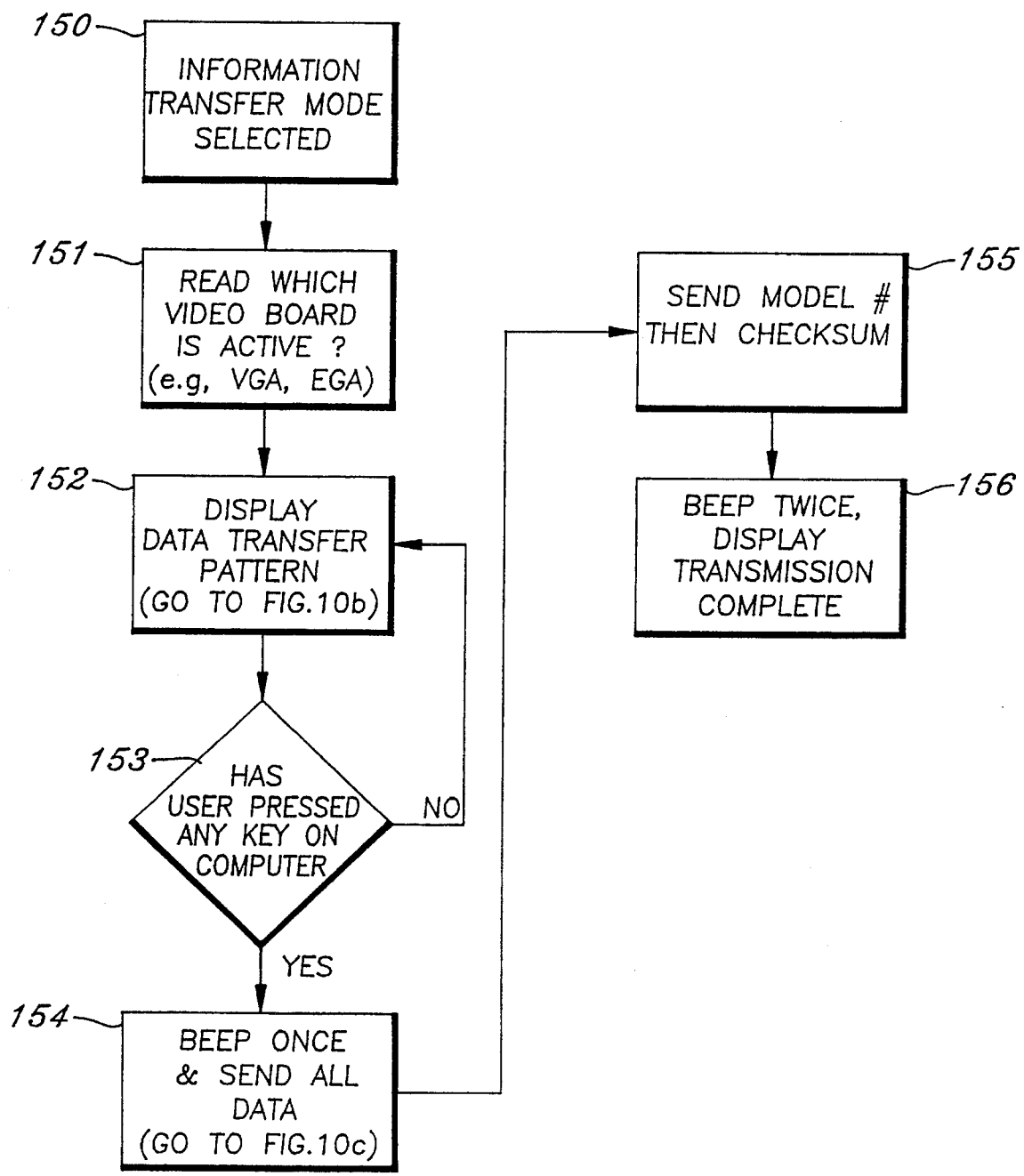
Figure 10B:
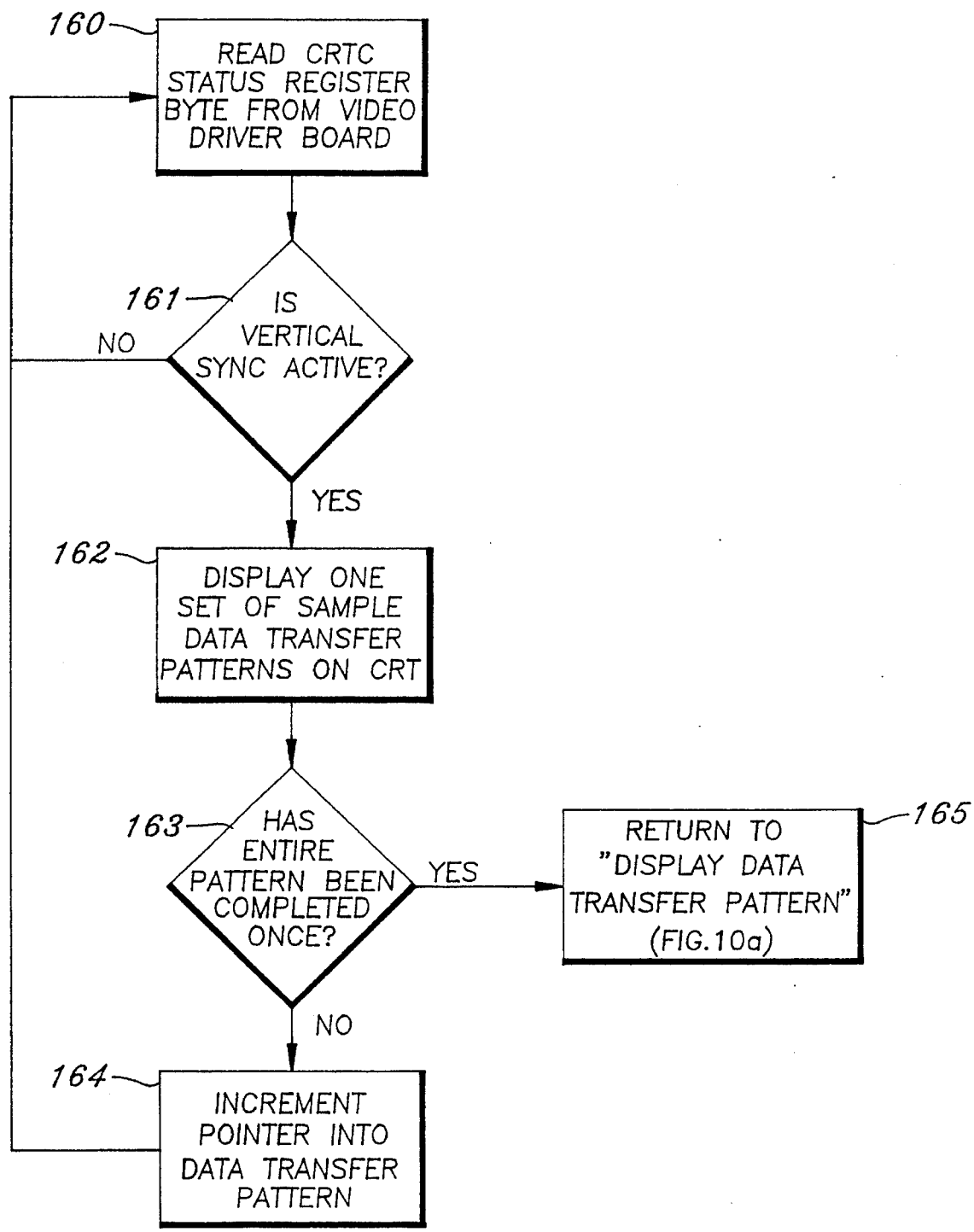
Figure 10C:
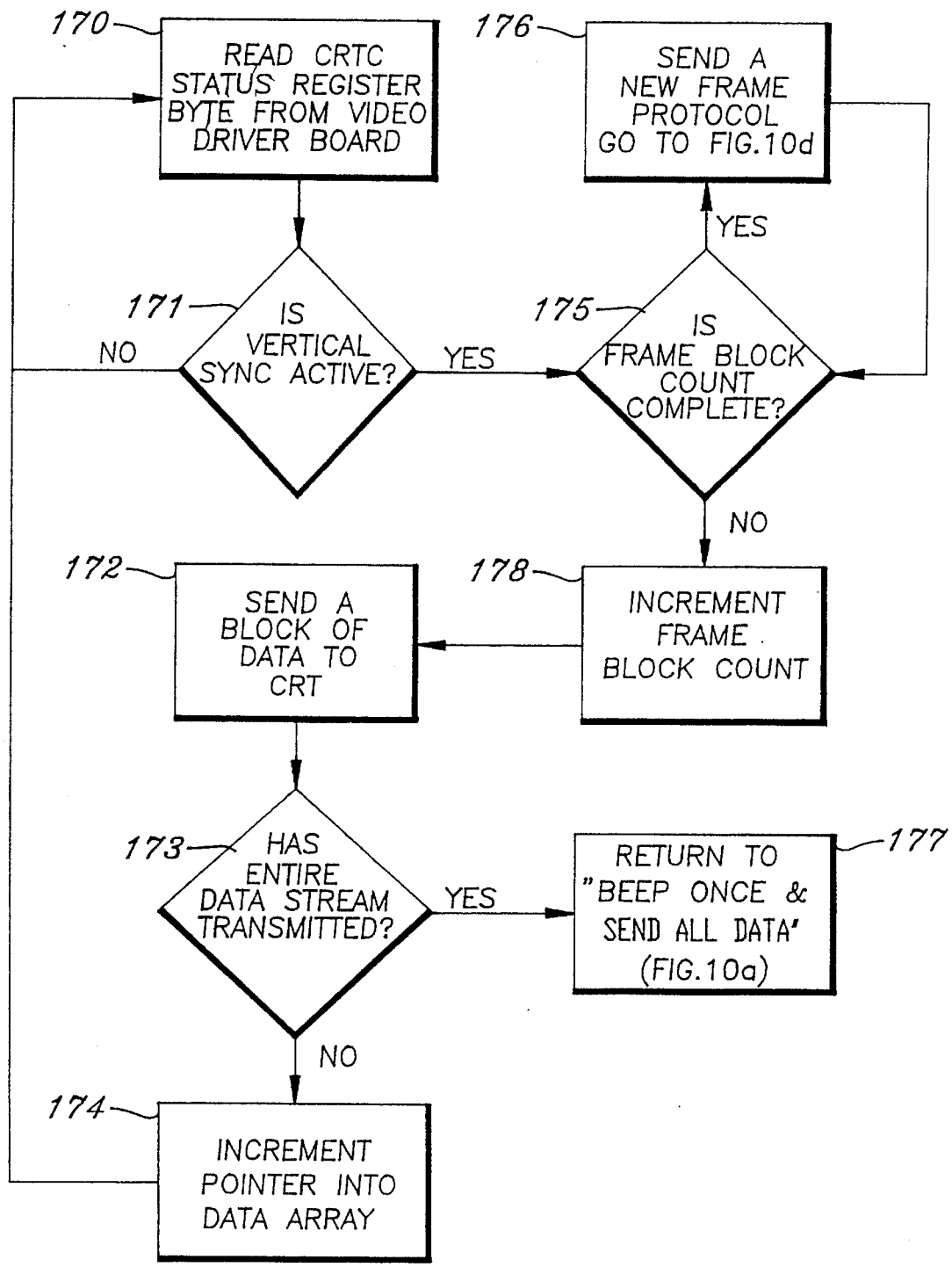
Figure 10D:
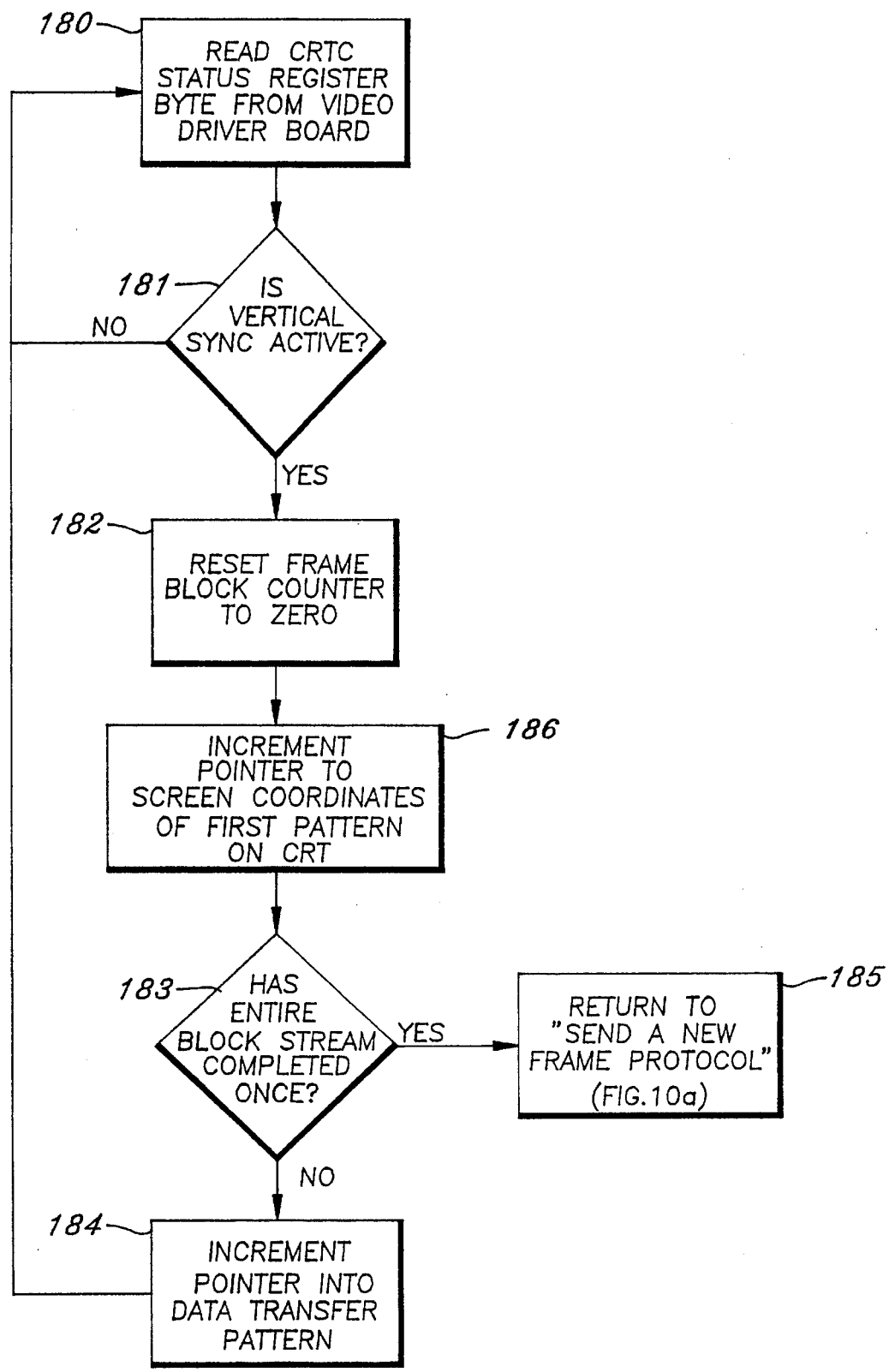

FIG. 6 depicts the receipt by portable device 20 of the flow of binary coded data during each CRT frame as a continuous stream of high and low logic levels corresponding to the presence or absence of a pulse in FIG. 5. The processing of the data by portable device 20 is detailed below as shown by the flow diagram of FIG. 9. More specifically, the process commences when the internal ROM program directs the central processing unit (CPU) 101 to read the signal level on external pins 109. This is captioned "Read Photosensor" at block 110 in FIG. 9.

Once the photosensor has been read (step 110), an initial check is made to insure that baud rate is still valid (step 111). The system then checks to see if a start message has been received (step 112). The start message may be any predetermined value or series of values. For example, the start message can be a pair of zeros followed by the model number of the watch. Until the start message is received, device 20 loops back to determine if the photosensor logic level has changed (step 110). After the start message has been received, the next message is the base address byte (step 113), containing the starting address where the input information should be loaded. This is followed by data bytes and address incrementing (step 114). A test is then conducted to determine if an end message was received (step 115). This message is similar to the start message, and could also be a pair of zeros followed by the model number of device 20.

If there is still data to be transmitted, device 20 loops back to receive data (step 114), until all of the data, and an end message, has been received. A test is then made to verify that the correct model number was received (step 116), and if not, error routine 117 is called.

If the proper model number was received, a checksum is produced and verified (step 118), and if the checksum is invalid (step 118), error routine 117 is also called. If no errors are evident, device 20 beeps once, displays a "Completed Transfer" message, and exits download mode (step 119). As previously stated, various protocols may be implemented by those skilled in the art without departing from the scope and spirit of the invention. For example, the protocol may be implemented using 6-bit words, 8-bit words, 16-bit words, or any other practical size words.

Information transmission by the data transmitter 10, including the generation of data blocks, is shown in the flow chart of FIG. 10. Information transfer begins with information transfer mode selected (step 150). CPU 101 sends out a request to read which video board is active (step 151), so that the proper video signals may be applied. Once the type of video board has been read, the data transfer pattern is displayed (step 152). Displaying the data transfer pattern entails first reading the CRTC status register (step 160). Next, a check is made to determine whether vertical sync is active (step 161). If vertical sync is not active, control is returned to status register step 160, until vertical sync becomes active. Once vertical sync is active, a vertical frame of data transfer patterns is displayed on the CRT (step 162). Then, a check is done to determine whether the entire pattern has been completed once (step 163). If the pattern is not complete, control transfers to status register step 160 via "increment" step 164. Once the pattern is complete, control goes back to display data transfer pattern step 152 via return block 175.

After the data transfer pattern has been initially displayed, a test is made to determine whether the user has pressed a key on the computer keyboard 16 or clicked the mouse 18 (step 153), which initiates data transfer. Once a key depression is detected, the transmitter beeps once and sends all of the data (step 154). This data transfer begins with reading the CRTC status register (step 170). A check is performed to determine if the vertical sync is active (step 171). If vertical sync is not active, control returns to step 170, until it becomes active. Once active, the system determines if the frame block count is complete (step 175). The frame block count is the number of data blocks transmitted during each frame, here two blocks. If the frame block count is not complete, the frame block counter is incremented by one (step 178) and a new block of data is sent to the CRT (step 172). If the frame block count is complete, a new frame is commenced (step 176).

A new frame is commenced by reading the CRTC status register (step 180), then checking to see if the vertical sync is active (step 181). If sync is not active, the sync is rechecked. Once vertical sync is active, the frame block counter is reset to zero (step 182) a new frame is commenced when the screen pointer is incremented to the screen coordinator of the first data block (step 186). A test is made to determine if the entire data block has been completed (step 183). If part of the block has not been displayed, the pointer is incremented (step 184) and control goes to status register step 180. After the entire block has been displayed, control returns to send a new frame protocol 176, via return block 185. New frame protocol 176 is accessed anytime the data block is lost, regardless of whether such loss is due to the user or other reasons.

Once the signal has been verified, computer 14 sends a block of data including start bit and stop bit to the CRT (step 172). This is followed by a test to see if the entire data stream has been transmitted (step 173). If data remains to be transmitted, the pointer into the data array is incremented (step 174), and control returns to status register step 170. Once the entire data stream has been transmitted, control transfers back to beep once step 154, via return block 177.

Following the complete transfer of the data, the transmitter sends the model number of the unit, followed by a checksum (step 155), which the portable information device 20 utilizes to verify the accuracy of the data transmission. The transmitting unit completes its task by beeping twice and displaying a message stating that transmission is complete (step 156).

If the transfer was successfully completed, portable device 20 beeps and displays "TRANSMISSION COMPLETE" or other appropriate message on display 24. Otherwise, portable device 20 beeps continuously and displays "ERROR" on display 24. The information that is transferred can: (1) add functionality to a multifunction electronic watch, (2) update a database within a multifunction electronic watch, or (3) it can automatically reset the time or date of a multifunction electronic watch.

An additional capability of the information transfer process is downloading data. For example, portable device 20 can also be used as a telephone number retriever. Manual entry of the telephone numbers and corresponding names into the portable device requires either additional entry keys (for the entire alphabet) or complex keystrokes. Direct entry of a long list of phone numbers would be a cumbersome, physically straining process, prone to data entry error. Instead, portable device 20 allows a user to maintain a database on a computer (which probably already exists) and simply download the data.

Figure 11A:
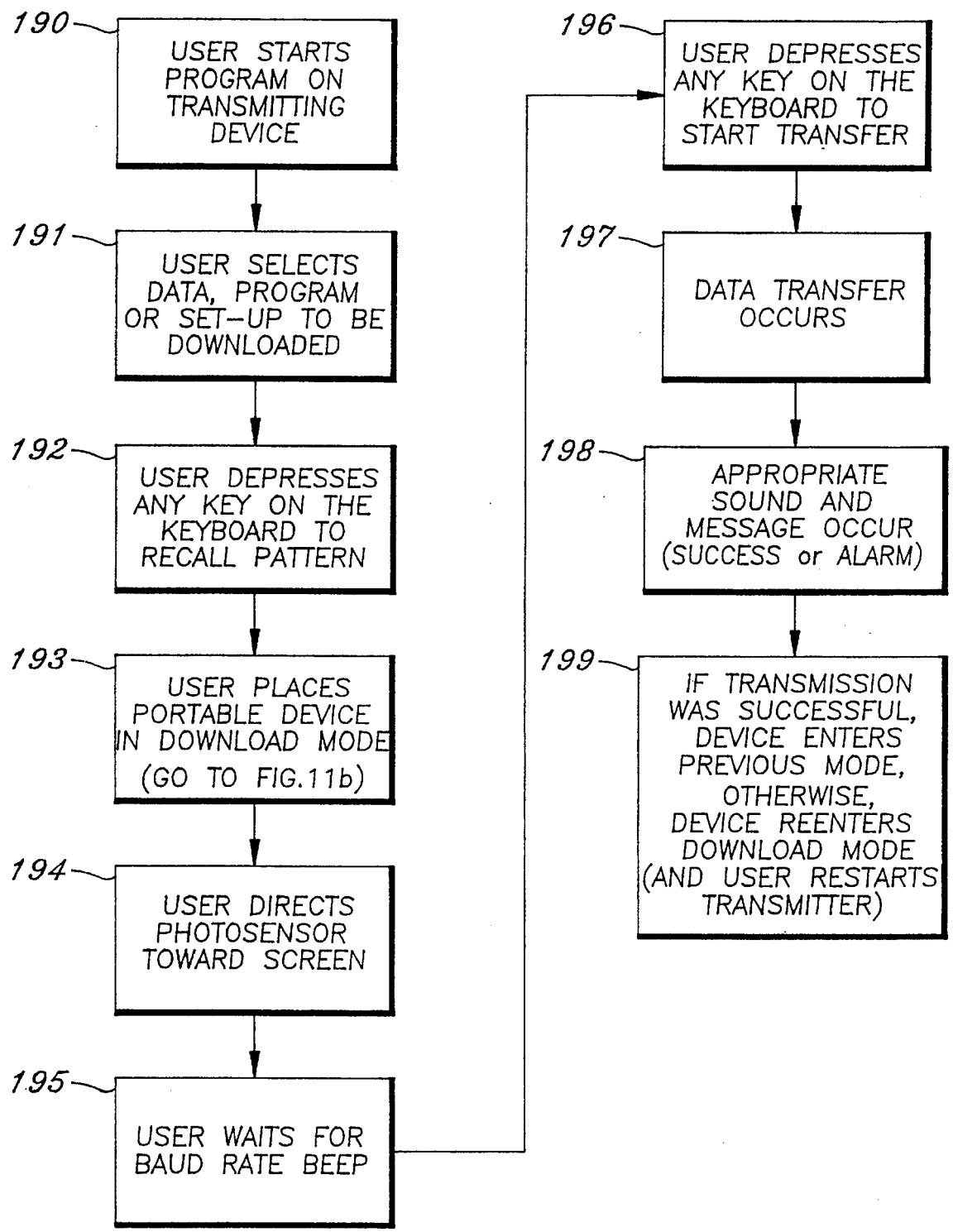
Figure 11B:
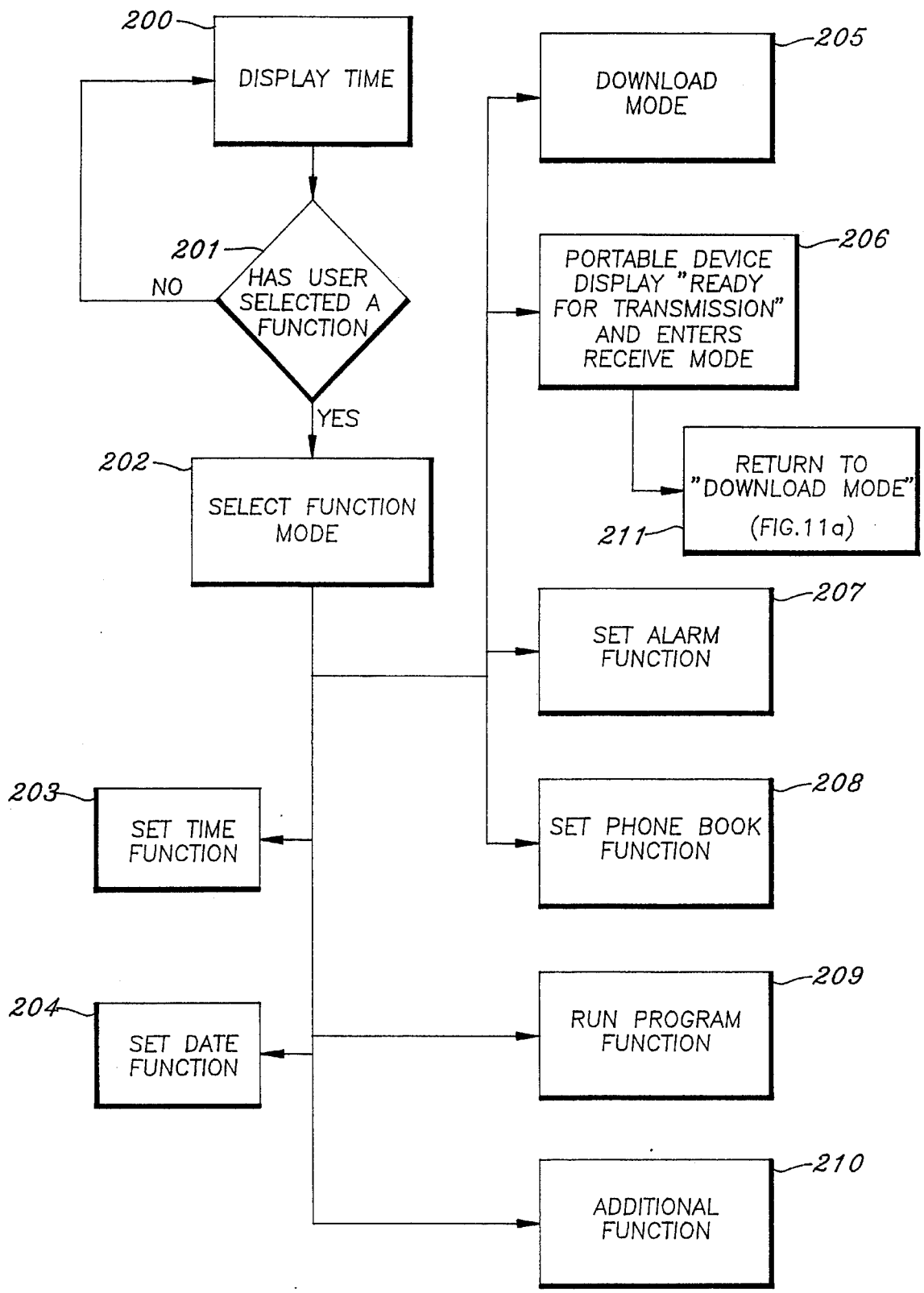
Figure 12:
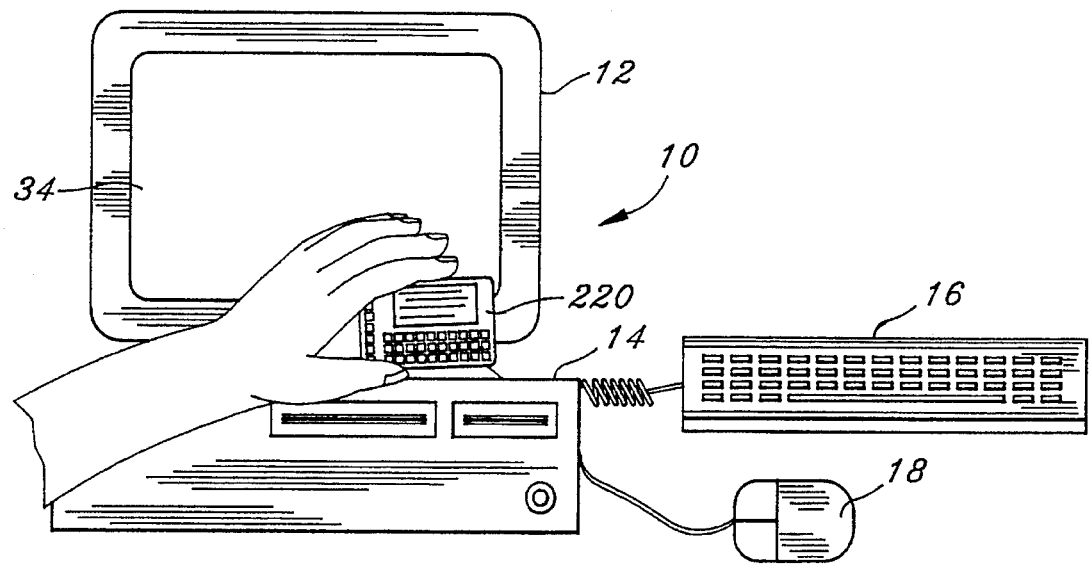

FIG. 11 is a flow than depicting the operation, including user inputs, of a typical portable information device. The user starts by initiating the transmitting program on the transmitting device (step 190). The user next selects the information to be downloaded (e.g., data, programs, configuration information) (step 191). This is followed by depressing a key on keyboard 16 or using a mouse 18 to recall the data transfer pattern (which can be adjusted by user inputs) (step 192). Now, device 20 must be placed in download mode (step 193). Before being placed in download mode (or any other function), device 20 continuously displays the time (step 200). A check 201 is repeatedly made to determine whether the user has selected a function. Once a function a selected, device 20 sets a flag to signify the chosen function (step 202). In addition to download mode 205, various other functions can be selected on a typical portable device, such as; set time 203, set date 204, set alarm 207, set phone book 208, run program 209, and similar additional functions 210. Once download mode has been selected, device 20 displays "Ready for Transmission" and begins awaiting data transmission (step 206). Return block 211 denotes completion of selecting download mode and a return to the normal operating sequence.

After selecting download mode, the user manipulates the wristwatch sensor 26 to face CRT screen 34 (step 194). As previously described, computer 14 may provide the user with the capability to adjust the size and position of the data transfer pattern on display 34 to the most convenient position. By applying the procedure described above, device 20 determines when the baud rate is matched and completes the procedure, concluding with an audible beep to inform the user of a valid signal (step 195).

Once the above is complete, the user depresses a key on keyboard 16 to initiate data transfer (step 196). After a key is depressed, data transfer occurs (step 197). Once the end message has been received and the transmissions checks have been made (e.g., model number and checksum verification), the appropriate audible and visual signals are given (step 198). Finally, if the transmission was successful, device 20 returns to the mode it was in before download mode was selected. Otherwise, device 20 reenters download mode and the data transfer is reattempted (step 199).

The invention as described above is very well suited for transferring data to an electronic multifunction wristwatch which has no keyboard, because of the difficulty of inputting data into the watch using pushbuttons or similar methods which are slow and time consuming. However the invention is also applicable and useful with various types of hand held devices having elementary or rudimentary keyboard input capability, such as credit card or hand held data bank type devices. Also the invention is suitable for relatively high data transfer baud rate as high as 9600 baud when using high resolution CRT monitors with low persistence phosphors and utilizing the entire screen for the data transfer pattern.

Figure 13:
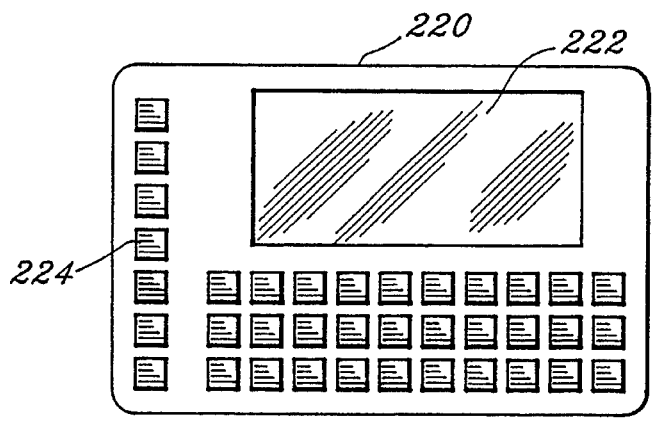
Figure 14:
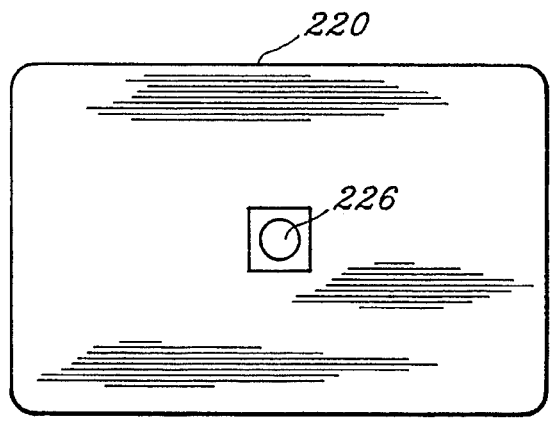

Referring to FIGS. 12 through 15 of the drawings, the same type of data transmitter is shown as illustrated in FIG. 1. However the portable information device is a hand held telephone menu and appointment scheduling device 220. It could also be any type of Personal Digital Assistant (PDA). Reference to the enlarged views of FIGS. 13 and 14 shows that device 220 includes a dot matrix LCD display 222 and keyboard keys 224 on its front side, while on the back side it carries a photosensor 226. Information 220 device has a relatively flat rectangular shape so that it may be carried in a coat pocket or purse. By locating photosensor 226 on the back, the portable information device 220 may be manipulated so that photosensor 226 faces the CRT screen 34, while the user can operate the keys 224 and view the display 222 facing the operator.

Figure 15:
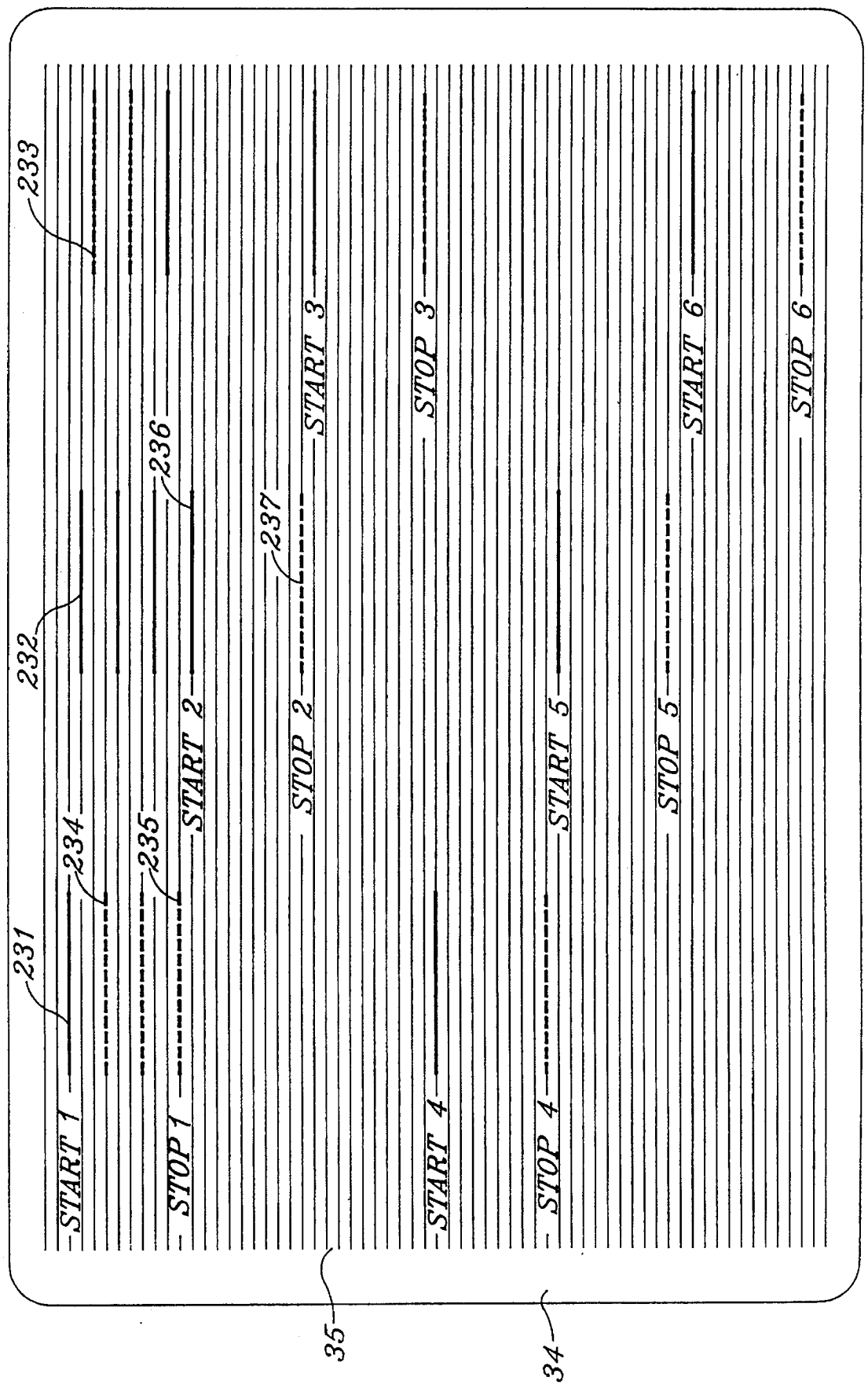

CRT 34, seen in FIG. 15, is arranged to display six data blocks each frame. FIG. 15 also illustrates that it is unnecessary for the successive data bits to appear adjacent to one another, or directly above or below one another, or to form a small "image" or pattern at a specific location on the video screen. By properly arranging the data transfer pattern of data blocks, higher baud rates of data transfer may be achieved by utilization of the entire screen during each frame. The only limitation is that there should not be more than one scan line segment (representing a data bit) on one line.

Following the previous convention, the solid lines indicate light pulses, while the dashed lines indicate absence of light pulses, transmitted at the same pulse repetition rate. As shown in FIG. 15, start bit of data block 1 is seen at 231, the first or least significant data bit follows at location 232 after several horizontal sweeps and a partial horizontal sweep of the raster, the second data bit at 232 after the same time interval, the third data bit 233 after the same time interval and so forth for eight data bits followed by a stop bit 235. The start bit of the second data block is indicated at 236 and after eight data bits is followed by stop bit 237. The screen coordinates of the locations where the scan segments commence must be chosen so that the time intervals (including flyback of the raster) are all equal. Data is transmitted until stop bit six occurs at reference 238, whereupon a new CRT frame commences. Assuming a VGA monitor with screen resolution 640×480, a baud rate of 4800 is possible using 68 bits per screen with seven scan lines per bit. However, with the selected convention of 10 bits per data block, only 60 bits per screen may be transmitted because there must be an integral number of data blocks, here 6 data blocks. Thus data transmission takes place at an "effective" baud rate of 4235.3, (4800×60/68). The system shown may transmit data asynchronously to a hand held device capable of receiving at 4800 baud, but at an effective baud rate of 4235.3.

Thus there has been disclosed an improved arrangement for transferring data to a wrist instrument or hand held device from a controllable light source, including a CRT such as found in a computer monitor or a television screen. Rather than constraining the operator to carefully position the device against the screen, the operator may hold the wristwatch or information device at some comfortable distance from the screen and download data in the simplex mode using one of many standard protocols. Various conventional codes may be employed transferring data at a rate comparable to that of modems used in telephone communications. This requires only a few seconds to fill the available memory in today's electronic wristwatches or hand held devices.

By employing a band pass filter to remove low frequency disturbances from ambient artificial lighting and the monitor vertical scan frequency, and by also by attenuating higher frequencies for unwanted signals at the horizontal scan frequency, data may be transmitted at a useful rate to download information into the portable information device. Other modifications will occur to those skilled in the art, and it is desired to secure in the appended claims all such modifications as fall within the true spirit and scope of the invention.

We claim:

1. A portable information device for receiving data from a data transmitter of the type having a CRT video display providing raster scanning of a screen at a horizontal scanning frequency and a vertical frame rate; and transmitting binary coded data in blocks of serial data bits as light pulses at a preselected pulse repetition rate less than said horizontal scanning frequency and greater than said vertical frame rate in synchronism with raster scanning of said screen so as to provide an integral number of one or more blocks for each vertical frame, said portable information device comprising:

(a) a portable casing adapted to be manipulated at a location spaced from, and within line of sight of, said screen;

(b) a photosensor mounted on said casing adapted to detect said light pulses when said portable casing is manipulated to direct said photosensor toward said screen;

(c) amplifier means within said casing connected to said photosensor to provide amplified binary coded receiver pulses corresponding to said light pulses, (d) filter means within said casing connected to said amplifier means and adapted to pass signals at said preselected pulse repetition rate and to attenuate ambient artificial light frequencies;

(e) first means connected to receive said receiver pulses from said filter means and to provide binary coded data blocks adapted to vary between high and low logic levels at said preselected pulse repetition rate; and (f) asynchronous data collection means within said casing connected to said first means.

2. The portable information device according to claim 1, wherein said filter means is a band pass filter adapted to pass signals within a frequency band including said preselected pulse repetition rate and to attenuate lower frequencies including 120 Hz and below and to attenuate higher frequencies including said horizontal scanning frequency and above.

3. The portable information device according to claim 2, wherein said band pass filter attenuates below a cutoff frequency of approximately 1 kHz and above a cutoff frequency of approximately 10 kHz.

4. The portable information device according to claim 1, wherein said first means is a retriggerable monostable multivibrator providing binary coded data blocks comprising start bit, a plurality of data bits and a stop bit.

5. The portable information device according to claim 4, wherein said asynchronous data collection means comprises a microprocessor having an asynchronous serial data port connected to said retriggerable monostable multivibrator, and wherein said asynchronous data collection means further includes at least one register for temporarily storing said data, and random access memory means for storing data from said register.

6. The combination according to claim 1, wherein said asynchronous data collection means is adapted to collect and store data blocks of serial data at said preselected pulse repetition rate.

7. The combination according to claim 1, wherein said portable information device comprises a microprocessor-based electronic instrument including an integrated circuit disposed within said portable casing having a CPU, ROM, RAM, switch control system and display control driver circuit connected by an information bus, said electronic instrument further having a display and switches disposed on the outside of said portable casing and an operating program residing in ROM adapted to display information from said RAM on said display in response to operation of said switches.

8. The information device according to claim 7, wherein said portable casing is a wristwatch casing and adapted to be attached to the wrist of a user.

9. The information device according to claim 7, wherein said portable casing has a flat rectangular shape adapted to be held in the hand of a user and includes a keyboard containing said switches.

10. The information device according to claim 7, wherein said operating program is further adapted to initiate a data transfer protocol from said data transmitter upon operation of said switches to place the device in download mode.

11. The information device according to claim 10, wherein said operating program is arranged to perform another function and to interrupt said other function upon initiation of said data transfer protocol.

12. The information device according to claim 7, wherein said operating program causes said data transfer protocol to read the photosensor and compare the baud rate of the light pulses on the CRT screen with the baud rate of said asynchronous data collection means and to proceed with data transfer if said baud rates are the same.

13. The apparatus defined in claim 7, wherein said portable information device further comprises programmable means.

14. The apparatus defining in claim 13, wherein said programmable means enables said portable information device to receive communications information from light pulses displayed at a plurality of pulse repetition rates.

15. The apparatus defined in claim 14, wherein said portable information device is a multifunction electronic watch.

16. The apparatus defined in claim 15, wherein said programmable means also converts said communications information into a plurality of functions which are performed by said multifunction electronic watch.

17. The apparatus defined in claim 15, wherein said programmable means also converts said communications information into a plurality of telephone numbers which are retrieved by said multifunction electronic watch.

18. The apparatus defined in claim 15, wherein said programmable means also utilizes said communications information to automatically reset the current time on said multifunction electronic watch.

19. The apparatus defined in claim 18, wherein said programmable means also utilizes said communications information to automatically reset the current date on said multifunction electronic watch.

20. The apparatus defined in claim 14, wherein said portable information device is a combination calculator/telephone number retriever.

21. The apparatus defined in claim 20, wherein said programmable means also converts said communications information into a plurality of functions which are performed by said combination calculator/telephone number retriever.

22. The apparatus defined in claim 20, wherein said programmable means also converts said communications information into a plurality of functions which are retrieved by said combination calculator/telephone number retriever.

23. System for transferring data from a data transmitter to a portable information device,
(1) said data transmitter comprising:
 (a) a source of binary coded data to be transferred;
 (b) a CRT video display with a video signal generator providing raster scanning of a screen at a horizontal scanning frequency and a vertical frame rate;
 (c) means formatting said binary coded data into blocks of serial data bits, with start bit and stop bit, each said block adapted to be transmitted as a stream of binary coded transmitter pulses at a preselected pulse repetition rate substantially less than said horizontal scanning frequency and substantially greater than said vertical frame rate;
 (d) means transmitting said blocks to said video signal generator in synchronism with raster scanning of said screen so as to provide an integral number of one or more blocks for each vertical frame, and
 (e) means modulating said video signal generator to vary the brightness of said screen and provide light pulses corresponding to presence or absence of said binary coded transmitter pulses;
(2) said portable information device comprising:
 (a) a portable casing adapted to be manipulated at a spaced location from, and within line of sight of, said screen;
 (b) a photosensor mounted on said casing adapted to detect said light pulses when said portable casing is manipulated to direct said photosensor toward said screen;
 (c) amplifier means within said casing connected to said photosensor to provide amplified binary coded receiver pulses corresponding to said light pulses,
 (d) band pass filter means within said casing connected to said amplifier means and adapted to pass signals within the frequency band of said preselected pulse repetition rate and to attenuate lower frequencies including 120 Hz and that of said vertical frame rate and to attenuate higher frequencies including said horizontal scanning frequency;

(e) retriggerable monostable multivibrator connected to receive said receiver pulses from said band pass filter and to provide binary coded data blocks comprising data bits, start bit and stop bit adapted to vary between high and low logic levels at said preselected pulse repetition rate; and (f) data collection means within said casing comprising an asynchronous serial data interface connected to said retriggerable monostable multivibrator, said data collection means further including at least one register for temporarily storing said data and random access memory means for storing data from said register.

24. The portable information device according to claim 23, wherein said band pass filter attenuates below a cutoff frequency of approximately 1 kHz and above a cutoff frequency of approximately 10 kHz.

25. The combination according to claim 24, wherein said portable information device comprises a microprocessor-based electronic instrument including an integrated circuit disposed within said portable casing having a CPU, ROM, RAM, switch control system and display control driver circuit connected by an information bus, said instrument further having a display and switches disposed on the outside of said portable casing and an operating program in ROM adapted to display information for said RAM on said display in response to operation of said switches.

26. The portable information device according to claim 25, wherein said electronic instrument is a wristwatch.

27. The portable information device according to claim 26, wherein said operating program is further adapted to initiate a data transfer protocol from said data transmitter upon operation of said switches to place the device in download mode.

28. The information device according to claim 26, wherein said operating program is arranged to perform another function and to interrupt said other function upon initiation of said data transfer protocol.

29. The information device according to claim 26, wherein said operating program causes said data transfer protocol to read the photosensor and compare the baud rate of the light pulses on the CRT screen with the baud rate of said asynchronous data collection means and to proceed with data transfer if said baud rates are the same.

30. A portable information device for receiving data from a data transmitter of the type having a controllable light source with a screen refreshed at a preselected frame rate; and transmitting binary coded data in blocks of serial data bits as light pulses at a preselected pulse repetition rate greater than said screen refresh rate, so as to provide an integral number of one or more blocks for each screen, said portable information device comprising:

(a) a multifunction electronic watch having a casing adapted to be manipulated at a spaced location from, and within line of sight of, said screen;

(b) a photosensor mounted on said watch casing adapted to detect said light pulses when said casing is manipulated to direct said photosensor toward said screen;

(c) amplifier means within said casing connected to said photosensor to provide amplified binary coded receiver pulses corresponding to said light pulses, (d) band pass filter means within said casing connected to said amplifier means and adapted to pass signals at said preselected pulse repetition rate and to attenuate ambient artificial light frequencies;

(e) first means connected to receive said receiver pulses from said band pass filter means and to provide binary coded data blocks adapted to vary between high and low logic levels at said preselected pulse repetition rate; and (f) asynchronous data collection means within said watch casing connected to said first means.

31. The portable information device according to claim 30, wherein said band pass filter attenuates below a cutoff frequency of approximately 1 kHz and above a cutoff frequency of approximately 10 kHz.

32. The portable information device according to claim 30, wherein said first means is a retriggerable monostable multivibrator providing binary coded data blocks comprising start bit, a plurality of data bits and a stop bit.

33. The portable information device according to claim 30, wherein said asynchronous data collection means comprises a microprocessor having an asynchronous serial data port connected to said retriggerable monostable multivibrator, and wherein said asynchronous data collection means further includes at least one register for temporarily storing said data, and random access memory means for storing data from said register.

* * * * *